A. FEINSTEIN.
BY DECREE OF COURT NOW A. NADELL.
VEHICLE TOP.
APPLICATION FILED JULY 17, 1916.

1,258,205.

Patented Mar. 5, 1918.
5 SHEETS—SHEET 1.

Inventor
ABRAHAM FEINSTEIN

Witness

Attorneys

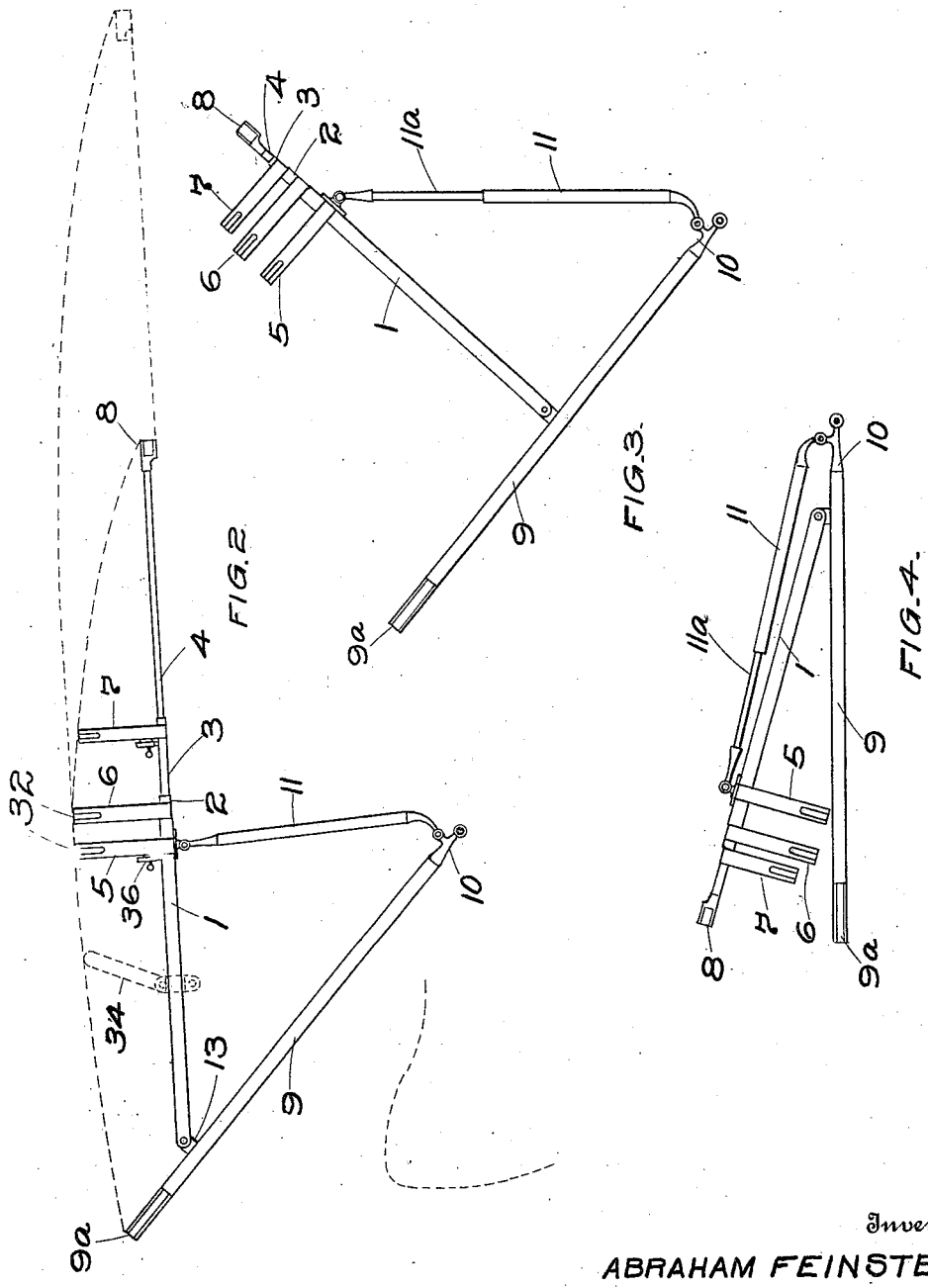

A. FEINSTEIN.
BY DECREE OF COURT NOW A. NADELL.
VEHICLE TOP.
APPLICATION FILED JULY 17, 1916.
1,258,205.
Patented Mar. 5, 1918.
5 SHEETS—SHEET 3.
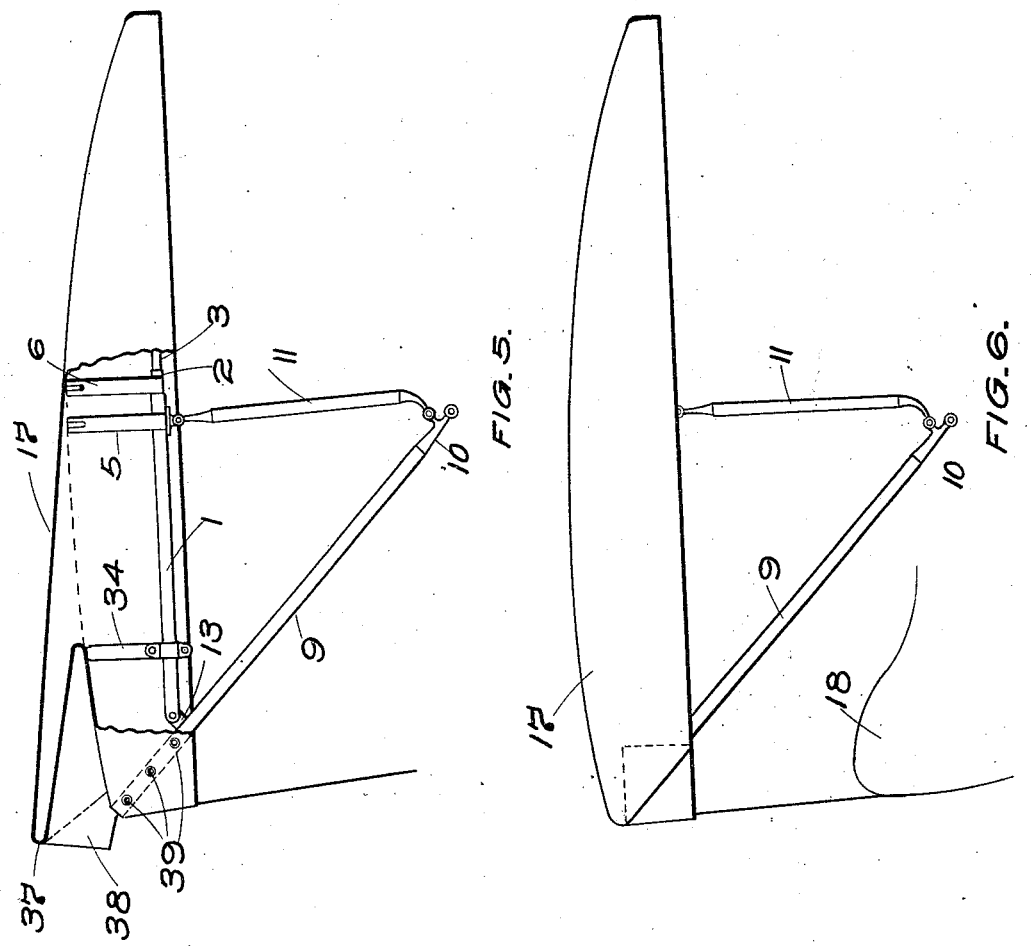
Witness
Anna M. Dorr
E. W. Inman
Inventor
ABRAHAM FEINSTEIN
By Barthel & Barthel
Attorneys

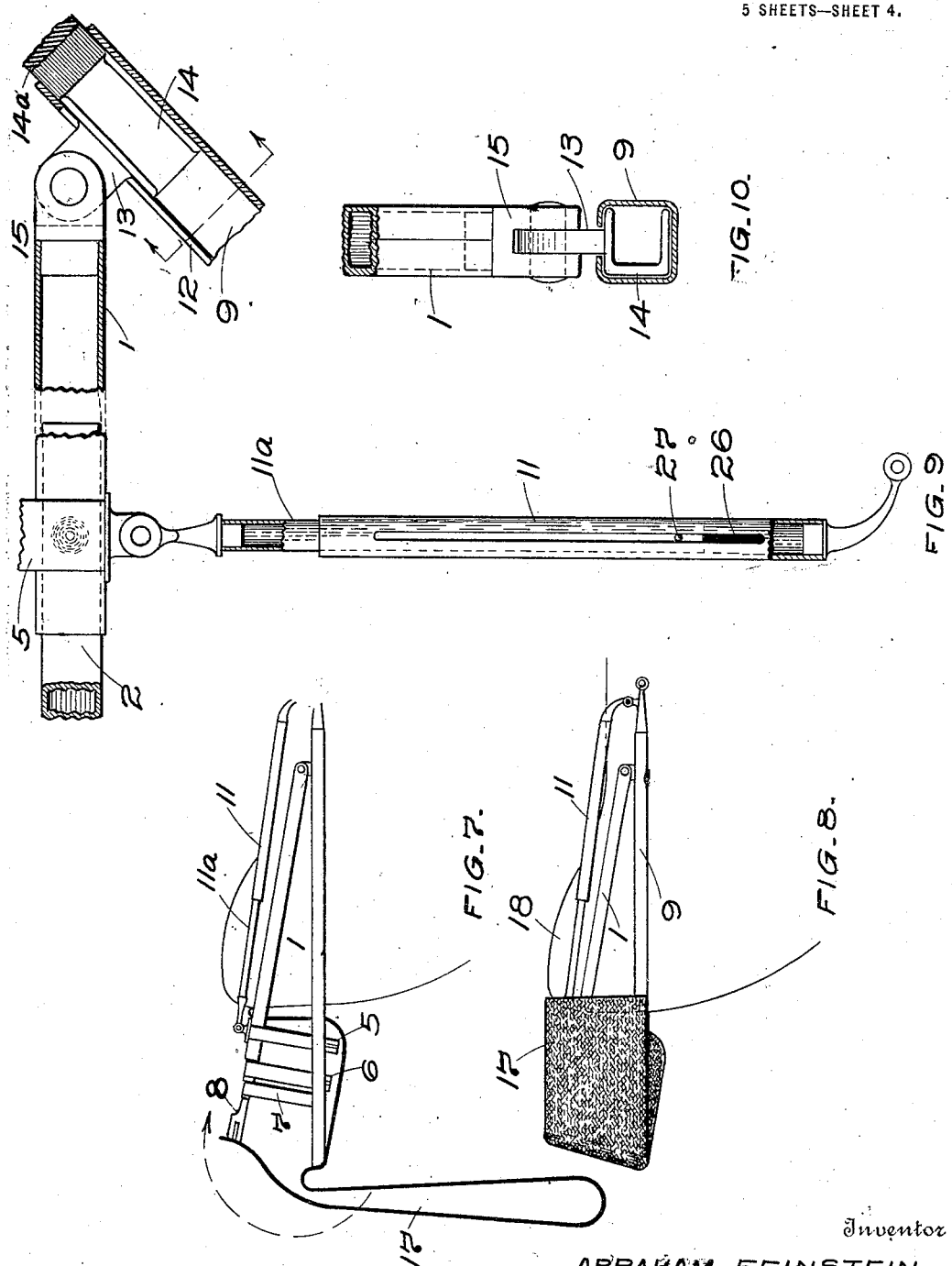

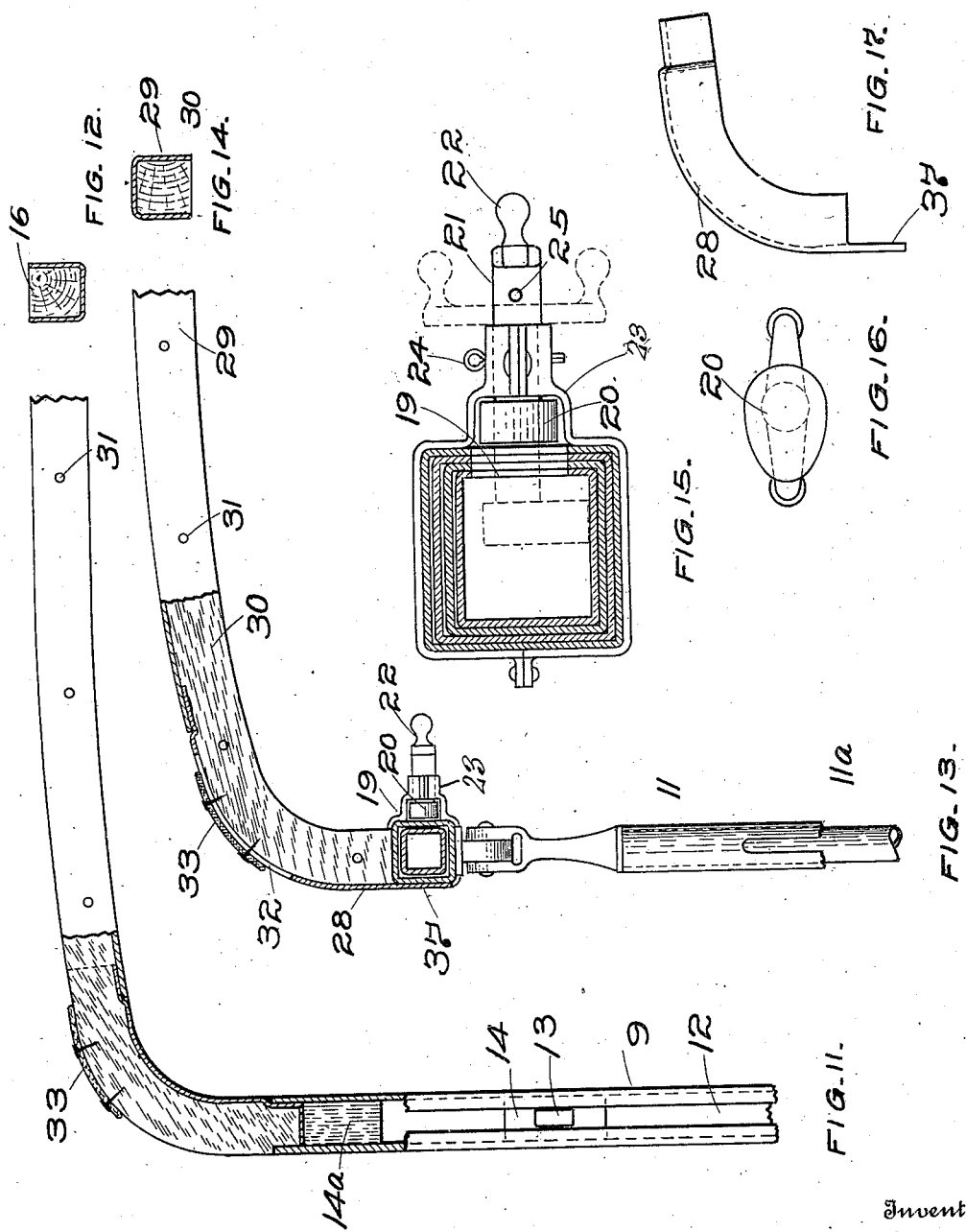

UNITED STATES PATENT OFFICE.

ABRAHAM FEINSTEIN, (BY DECREE OF COURT NOW ABRAHAM NADELL,) OF ANN ARBOR, MICHIGAN.

VEHICLE-TOP.

1,258,205.   Specification of Letters Patent.   Patented Mar. 5, 1918.

Application filed July 17, 1916. Serial No. 109,616.

*To all whom it may concern:*

Be it known that I, ABRAHAM FEINSTEIN, a citizen of the United States of America, residing at Ann Arbor, in the county of Washtenaw and State of Michigan, have invented certain new and useful Improvements in Vehicle - Tops, of which the following is a specification, reference being had therein to the accompanying drawings.

The objects, construction and arrangement of my improved vehicle top are herein set forth with sufficient clearness to enable those skilled in the art to which the construction and use relate to make and use the same.

The primary object of the invention is to provide an adjustable top for vehicles of various lengths which may be extended and shortened as desired to cause the same to conform to the length of the vehicle to which it is applied.

A further object is to provide a top which may be shortened or adjusted so that it will form a top for the rear seat only of the vehicle to which it is applied, if so desired, or a top of any other intermediate length.

An additional object is to provide a top of such construction, that when the same is collapsed a portion of the fabric covering for the top may be arranged into a hood to cover the folded top, to exclude the dust therefrom and to otherwise protect the same, as well as to impart to said collapsed top a more pleasing and ornate appearance.

With said objects in view I have devised the construction shown in the drawings which form a part hereof, the respective figures of which are as follows:—

Fig. 2 is a side elevation of said framework in one of its shorter positions of adjustments;

Fig. 3 is a side elevation of said framework in a partially folded position;

Fig. 4 is a side elevation of said framework in the folded condition, as it is, when the top is collapsed;

Fig. 5 is a side elevation of the top in one of its shorter adjustments with the fabric covering in place, and shows how the slack fabric is disposed of or folded when the frame is shortened;

Fig. 6 is also a side elevation of the top showing the slack fabric properly and completely folded;

Fig. 7 is a side elevation of the top in the collapsed condition showing the fabric in section and that it is attached to the framework at its ends only so that it may be utilized as a dust hood;

Fig. 8 is a side elevation of the collapsed top showing the fabric utilized as a dust hood, and Figs. 9, 10, 11, 12, 13, 14, 15, 16 and 17 are details.

Figure 1:
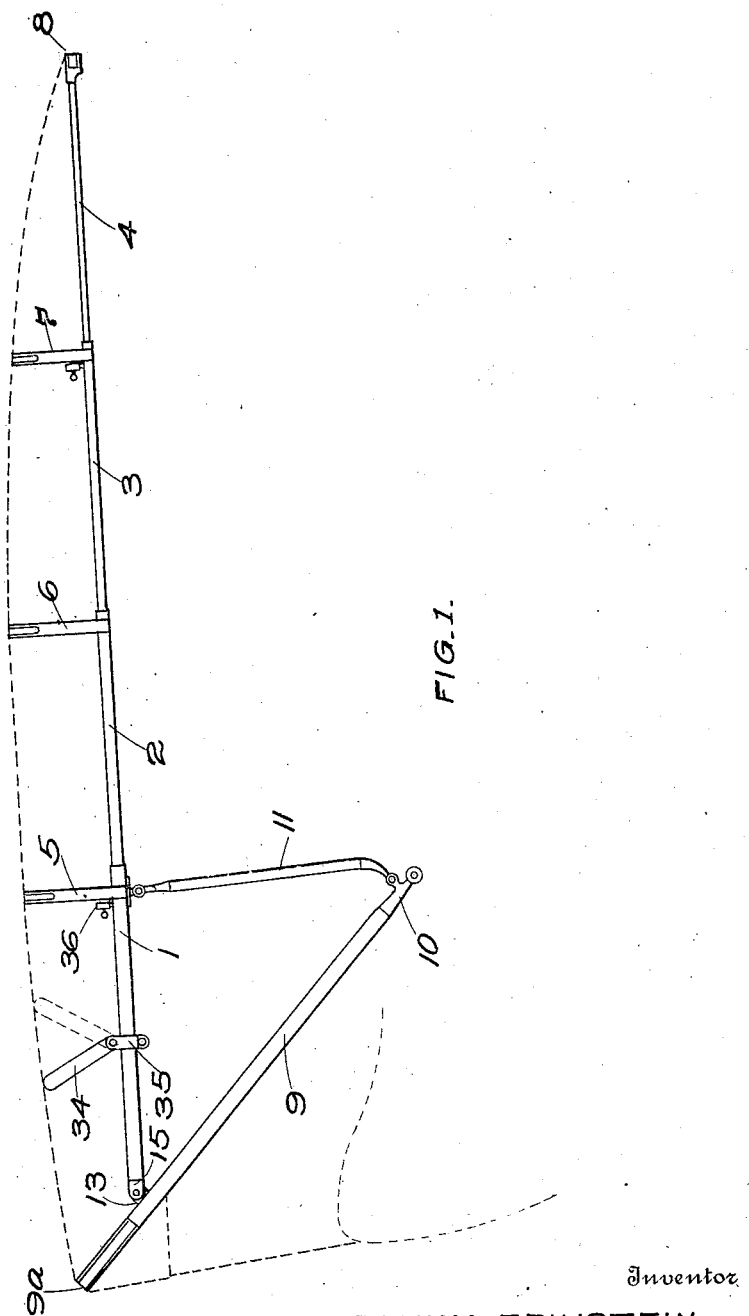
Figure 1 is a side elevation of the metallic frame-work of my improved top in its fully extended position; all of the fabric covering for the top is omitted, in order to more clearly illustrate the construction of the frame.

The construction here shown is substantially as follows:

For the side bars of the frame I utilize several telescoping sections of square tubing, 1, 2, 3 and 4 which are arranged in pairs, the larger primary sections 1 being at the rear of the frame. In proximity to the outer end of each of the sections 1, 2 and 3 and extending transversely across said frame, I attach the respective ends of the vertically-extending bows 5, 6 and 7, and to the forward end I attach a horizontally extending bow 8 to form the front edge of the top. The rear end of said top is composed of a combination bow and supporting arm 9 which not only forms the rear portion of the frame for the top but also extends diagonally downwardly and forwardly and constitutes the member by means of which the top is secured to a vehicle. Attached at its lower end to the lower terminal 10 of said arm 8 is the vertically extending brace or supporting member 11, the upper end of which is attached to section 1 of said side bars; said supporting member supports said frame firmly in the horizontal extended position. Said member 11 is formed of two sections of round telescoping tubing and is extensible for a purpose to be presently set forth. By means of said terminal 10 the top is secured to the body of a vehicle. Said rear supporting arm is also formed of a tubular member 29, as shown, especially in Figs. 9, 10 and 11. Said member 9 is provided with a longitudinal slot 12 in its front side for the outward projection of a lug 13 of the slide block 14; a knuckle or coupling member 15, which, is rigidly secured to the rear end of section 1, engages said lug 13, and forms a flexible joint therewith. Said slide-block 14 is free to slide longitudinally within the arm 9; said block 14 bears against a resilient cushion 14ª when the top is in its service position.

When the top is to be collapsed the sections 1, 2, 3 and 4 are first telescoped, then the rear end of section 1 is drawn down, as partially shown in Fig. 3 and the front end of the frame is swung over into the position shown in Fig. 4. In order to permit said movement of said section 1, said supporting member 11 is composed of two sections of telescoping tubing the internal member 11ª of which extends to the position shown in Fig. 4, when the frame is folded or collapsed. Said extensibility of said member 11 permits a free upward movement of said top framework when the same is being folded, but affords a firm and rigid support for said top in its service position.

Each of the end bows 9ª and 8 is composed of a channel-shaped metallic section shown especially in Fig. 12 with the opening thereof disposed outwardly and in said opening is secured a filler of wood 16 which is for the purpose of supplying a suitable material to which to tack or otherwise secure the fabric covering 17 of the top. Said fabric is secured to said end bows 9ª and 8 only, as indicated in Fig. 7, so that when the top is collapsed the slack fabric will be free, if permitted to do so, to fall or depend downwardly in the position shown in Fig. 7. Said fabric is however folded over in the direction indicated by the arrow in said Fig. 7 to form a dust hood for the collapsed top and the back of the rear seat 18 of the vehicle, thus imparting to the same a neat and ornate appearance.

For the purpose of preventing the respective sections 1, 2, 3 and 4 from vibrating when telescoped and to prevent any possible noise which might be caused thereby, I provide a compression device or lock, shown especially in the enlarged view Fig. 15, which is constructed in the following manner; through each of said sections 1, 2, 3 and 4 is formed a port or opening 19 all of which openings are arranged and located so that they will be in alinement or register (see Fig. 15) when said sections are in the telescoped condition. In proper juxtaposition to said ports 19 is operably secured a cam-shaped locking device 20 which is provided with a cylindrical stem 21 having a handle 22; a suitable housing 23 is provided for the reception of said stem and in which said stem is free to revolve also to move longitudinally. When said lock is not in use the cam 20 is drawn outward by means of the stem and handle and is secured in this non-operative position by the cotter 24. When the said sections are telescoped and it is desired to lock them against any possible vibration the cam 20 is moved inward and turned so that the point thereof bears firmly upon the inner tube 4 and thus presses all of the sections firmly together and in this position the lock is itself in turn locked in the locking position by the re-insertion of the cotter 24, which now passes through the hole 25 of stem 21 which is in proper registry for the reception of said cotter.

My improved top is adjustable as to length and is so constructed that it may be adjusted into a top of any length less than its full extension shown in Fig. 1, as illustrated in Figs. 5 and 6. When said top is to be adjusted to one of the shorter extensions, one or more of said pairs of side sections of telescoping tubing may be adjusted inwardly either the whole length thereof or any desired amount, and locked in said partly extended position or positions by means of the locks 36. The slack 37 which is thus caused in the fabric covering 17, is then gathered into a single fold as shown in Fig. 5, then it is carried downward so that it lies smoothly upon the top; the corners 38 are then folded inwardly and the fold adjacent to its rear edge is then secured in position by any suitable means as the snap fasteners 39.

For the purpose of preventing the section 11ª of said supporting member from being withdrawn from the section 11 into which it telescopes, I form in said section 11, a slot 26 for the reception of a pin 27, which is secured in said section 11ª and projects into said slot and when said pin reaches the upper end of said slot it is stopped from further outward movement. It will be readily understood that it is immaterial which of the sections 11 or 11ª contains said slot, and which contains the pin and it will be readily understood that any other suitable form of stop could be substituted for said slot and pin.

In the manufacture of my improved top and as a commercial and manufacturing expedient, I form the curved ends or elbows 28 of the intermediate bows 5, 6 and 7 as shown in Fig. 17. Said elbows 28 are of channel shape with the opening disposed inwardly in conformity with the shape and position of the top or transversely-extending portion 29 as shown in Fig. 14. Said channel is preferably provided with a wood filler 30 which is secured in position in any suitable manner as by pins 31. A slot 32 is formed through the outer upper wall of each of said elbows 28 to facilitate the attachment of webbing 33 that extends longitudinally the full length of the top upon each side thereof and is attached to each of the crossbows. Said webbing serves two purposes, viz:—that of automatically regulating the distance between said bows 5, 6, 7 and 8 when the top is extended and that of assisting to support the fabric covering for the top to prevent it from sagging. As previously stated, the channel of the rear bow 9a and the front bow 8 is disposed outwardly and said webs are attached directly thereto.

There is a variation in the width of vehicle bodies which makes it necessary to be able to supply tops of varying widths in the most expeditious and economical manner and it is especially upon this account that said elbows 28 (Fig. 17) are formed as a separate detail. The intermediate transversely extending portion of said bows are formed in uniform lengths which are as long as extreme cases of width will require and when narrower tops are made it is only necessary to cut said intermediate portions to proper length and to weld the elbows to the respective ends thereof. Said welding is preferably done by the electrical process. The lower end of said elbows is provided with a downwardly, projecting leaf or portion 37 which extends downwardly into contact with the outside of the respective section of the telescoping bar which carries the same and said leaf is welded to said section, preferably, by an electrical spot-weld. The elbows for the rear member 9 and the front member 8 are formed with the opening disposed outwardly instead of inwardly, as shown in said Fig. 17.

Owing to the various lengths of vehicle bodies to which my top may be applied, it is sometimes desirable to provide intermediate adjustable and removable cross bows as 34 arranged to be removably attached, usually to the rear bars 1, but said removable cross-bows may be attached to any of the other bar sections 2, 3 or 4. Said bars are especially intended to sustain the balance and keep it from sagging between the cross-bows when the top is applied to a long car and is fully extended, but they also serve to strengthen and stiffen the frame. It is very seldom however, that it is found to be desirable to apply said supplementary cross-bows to any but the sections 1 of said frame. Said supplementary bows are removably attached by means of clips 35.

It is desirable to provide a locking means whereby the various sections 1, 2, 3 and 4, (especially 1 and 4) may be secured in any intermediate position of their longitudinal movement, and for this purpose I provide the well known form of bolt lock 36 which locks are secured to the vertical portion of a cross bow and in close juxtaposition to the sections of the side bars with which it coöperates, and the relatively movable section is provided with a number of holes for the reception of the bolt of said lock, and when said bolt is engaged with any of said holes said relatively movable section is firmly retained in said engaged position.

While I have shown in said drawings a certain construction which I have found to be satisfactory in actual practice and have fully described the same, it should be understood that said construction may be departed from in many respects without departing from the scope of my invention. The forward end of the top may be supported in any suitable way, and especially that commonly employed in automobile tops by connecting said forward end to the upright standards of the windshield.

What I claim is:—

1. A vehicle top comprising in combination a frame-work consisting of an upwardly, rearwardly-extending combined supporting arm and a transverse bow, said bow being adapted to form the rear end of the upper portion of said top, said arms being composed of tubular members and provided respectively at their lower ends with means for attaching same to a vehicle, there being a slot extending longitudinally of each of said arms through the front wall thereof, a slide-block positioned within each of said arms and arranged to move longitudinally therein, said blocks having as a feature thereof a lug adapted to project through and to travel in said slot, a knuckle flexibly connected to each of said lugs, a primary tubular member positioned upon each side of said frame-work and each connected at its rearward end to one of said knuckles, a series of secondary pairs of tubular telescoping members carried by said primary members and arranged to form, when extended, the respective sides of said framework, a transversely-extending bow carried by each of said pairs of side members and an extensible normally vertically extending supporting member at each side of said frame pivotally connected at the upper end to said primary member, and pivotally connected at its lower end to said arm in proximity to the lower end thereof.

2. A vehicle top comprising in combination a frame-work consisting of upwardly rearwardly-extending arms having a bow rigidly connecting the same at the upper ends thereof, said bow being adapted to form the rear end of the upper portion of said frame-work, said arms being composed of tubular members and provided respectively at their lower ends with means for attaching same to a vehicle, there being a longitudinal slot extending through the front wall of each of said arms, a slide-block positioned within each of said arms and arranged to move longitudinally therein, said blocks having as a feature thereof a lug adapted to project through and to travel in said slot, a knuckle flexibly connected to each of said lugs, a primary tubular member positioned upon each side of said frame-work, each connected at its rearward end to one of said knuckles, a series of secondary telescoping members carried by each of said primary tubular members and disposed in pairs and adapted to telescope into said primary member, a transversely extending bow rigidly affixed to each of said pairs of said telescoping members, removable adjustable bows carried by one or more of said pairs of telescoping members, and an extensible normally vertically extending supporting member positioned at each side of said framework each pivotally connected at its upper end to one of said primary members, also pivotally connected at its lower end to said arm adjacent to the lower end thereof.

3. A vehicle top comprising in combination, a framework consisting of upwardly, rearwardly extending combination supporting arms and transverse bow which is substantially a rigid unitary structure said transverse bow being adapted to form the rearward end of said framework, said arms being composed of tubular members and provided respectively at their lower ends with means for attaching said arms to the body of a vehicle, there being a longitudinally-extending slot formed through the front wall of each of said arms, a slide-block positioned within each of said arms and arranged to move therein, a flexible buffer block positioned within each of said arms at the upper portion thereof and adapted to limit the upward movement of said blocks, said blocks having as a feature thereof a lug adapted to project through and to travel in said slot, a knuckle flexibly connected to each of said lugs, a primary tubular side member positioned upon each side of said framework each connected at its rear end to one of said knuckles, a secondary telescoping series of side members carried by each of said primary side members and arranged in pairs, said series of secondary members being adapted to telescope within said primary members, a transversely-extending bow rigidly carried by each of said pairs of side members at the outer ends thereof, and a vertically-extending brace or supporting member at each side of said frame-work pivotally attached at its upper end to said primary side member, also pivotally attached at its lower end to said supporting member adjacent to the lower end thereof, said brace being formed of sections of telescoping tubing which are arranged to be extensible for the purpose set forth.

4. A vehicle top comprising in combination, a frame-work consisting of an upwardly rearwardly extending combined supporting arms and transverse bow, said bow being adapted to form the rear end of the upper portion of said top and consisting of a channel-shaped member with its opening disposed outwardly, a wood filling in said channel, said arms being composed of tubular members and each provided respectively at its lower end with means for attaching same to the body of a vehicle, there being a longitudinal slot formed in the front wall of each of said arms, a slide block positioned within each of said arms, and arranged to move longitudinally therein, said block having as a feature thereof, a lug adapted to project through and to travel in said slot, a knuckle flexibly connected to each of said lugs, a primary tubular member positioned upon each side of said frame-work and each connected at its rearward end to one of said knuckles, a series of secondary, telescoping tubular members carried by each of said primary members and arranged in pairs and forming when in the extended position the respective sides of said frame-work a transversely, extending bow carried by each of said pairs of side members, said transverse bows consisting of channel-shaped members with the opening thereof positioned downwardly, a filler of wood occupying said opening, there being slots formed through the upper wall of said last mentioned channel for the passage of web-securing devices, webbing arranged along the upper side of said transverse bows and attached to each thereof, and an extensible normally vertically-extending supporting member pivotally connected at its upper end to said primary member also pivotally connected at its lower end to said arm in proximity to the lower end thereof.

5. A vehicle top comprising in combination a collapsible frame-work consisting of a main supporting element which is a substantially unitary structure composed of upwardly-extending supporting arms and a transverse bow, said arms being of tubular construction and provided respectively at their lower ends with means for flexibly attaching said framework to a suitable portion of a vehicle, there being a longitudinally extending slot formed through the forward wall of said tubular arms, a slide-block positioned within said arms and having as a feature thereof a lug arranged to project through and to travel in said slot, a knuckle flexibly connected to each of said lugs, a primary tubular member positioned at each side of said frame-work and each attached at its rearward end to one of said knuckles, extensible supporting members attached at its upper end by a hinged connection to each of said primary members, and also attached at its lower end by a hinged connection to each of said supporting arms adjacent to the lower end thereof, a series of secondary telescoping members carried by each of said primary members and arranged to be telescoped within the forward ends of said primary members, said secondary members being arranged in pairs, a transversely extending bow carried by each of said pairs of telescoping members, a fabric top or covering for said frame-work attached thereto at the front end and the rear portions thereof only, whereby said fabric is adapted to be formed into a single fold when said framework is collapsed, to form a hood or covering therefor.

6. A vehicle top comprising in combination a frame-work composed of a plurality of tubular members arranged to telescope one within the other, one wall of each of said tubular members being provided with an opening, said openings being so positioned as to be in register when said tubular members are in a telescoped position, and a cam member operably mounted upon the outermost of said tubular members in alinement with said openings, adapted to enter said openings, and operable to exert a pressure upon the inner wall of the innermost of said tubular members for the purpose of clamping all of said members firmly together.

In testimony whereof I affix my signature in the presence of two witnesses.

ABRAHAM FEINSTEIN,
(*By decree of Court now Abraham Nadell.*)

Witnesses:
OTTO F. BARTHEL,
ANNA M. DORR.